United States Patent [19]

Sun et al.

[11] Patent Number: 4,972,290
[45] Date of Patent: Nov. 20, 1990

[54] ELECTRIC POWER SYSTEM WITH REMOTE MONITORING AND CONTROL OF PROTECTIVE RELAYS

[75] Inventors: Shan C. Sun; John S. Wargo; James P. Garitty, all of Coral Springs, Fla.

[73] Assignee: ABB Power T & D Company Inc., Blue Bell, Pa.

[21] Appl. No.: 414,975

[22] Filed: Sep. 29, 1989

[51] Int. Cl.⁵ .............................................. H02H 3/18
[52] U.S. Cl. ........................................ 361/64; 361/66; 361/68; 361/81; 364/487
[58] Field of Search .................. 361/64, 65, 66, 67, 361/68, 79, 80, 81; 364/487, 492; 340/825.08, 825.1, 825.13

[56] References Cited

U.S. PATENT DOCUMENTS

| | | | |
|---|---|---|---|
| 4,528,611 | 7/1985 | Udran | 361/81 |
| 4,855,861 | 8/1989 | Bergman et al. | 304/483 X |
| 4,864,457 | 9/1989 | Bergman et al. | 361/66 |

*Primary Examiner*—Derek S. Jennings
*Attorney, Agent, or Firm*—Richard V. Westerhoff

[57] ABSTRACT

Monitoring and control of analog electromechanical protective relays and digital microprocessor based relays is integrated through a system including slave stations which record and time tag contact activity at each of the analog relays. The slave stations continuously retain digital samples of a predetermined number of the most recent cycles of the currents and voltages at the analog relays and when a trip occurs store the retained samples as pre-fault values together with a preset number of post-fault samples. A master station communicates with the slave stations monitoring the analog relays and with the digital relays through a two way communications network. The master station repetitively polls the slave stations and digital relays for contact activity. Detailed data such as the time tags and pre-fault and post-fault currents and voltages are then requested from those stations reporting contact activity. Either the slave stations or master station calculate fault location and type from the fault voltages and currents, an periodically calculate routine metering parameter such as watts and VARs.

15 Claims, 4 Drawing Sheets

ELECTRIC POWER SYSTEM WITH REMOTE MONITORING AND CONTROL OF PROTECTIVE RELAYS

BACKGROUND OF THE INVENTION

1. Field of Invention

This invention relates to electric power systems with protective relays and in particular to such systems in which one, and more typically, in which most, of the protective relays are electromechanical analog devices. The invention provides apparatus for monitoring and controlling the operation of these analog protective relays either alone or simultaneously with digital relays.

2. Background Information

Electric power systems include protective relays which monitor conditions in the system and operate circuit breakers in response to adverse conditions to protect various segments and components in the system. Many of these protective relays are analog devices that have been in place for years. They comprise electromechanical mechanisms which respond to predetermined values of current, and in some relays voltage, and the relationship therebetween to operate electrical contacts. The contacts perform various functions such as tripping a circuit breaker, generating an alarm or providing a signal to another protective relay. For the most part, these analog relays only provide as an output the designed contact operation. They do not provide an indication of the conditions which produced activity in the output contacts. For instance, the principal of operation of a distance measuring relay is that the distance of a fault can be determined by a comparison of the complex impedance of the line derived from the current and voltage at the relay to a reach characteristic. If this comparison indicates that there is a fault within the protection zone of the relay, a trip contact is actuated. However, the analog distance relay does not provide as an output any indication of where the fault is located or what the impedance was, or even what the current and voltage were which caused the trip. Similarly, an overcurrent relay trips in response to detection of a line current which exceeds a set point value, but it does not provide a quantitative indication of the magnitude of current which caused the trip.

Typically, substations in an electric power system have many protective relays. For the most part, the analog relays operate autonomously and without supervision. As mentioned, some relays provide signals to other relays, however, this is done over dedicated lines. Generally, information on the state of the relay contacts and the conditions at the relay is not available to supervisory personnel without dispatching someone to individually inspect the relays. In some instances, remote terminal units (RTU's) provide information on contact status for auxilliary equipment, but not on the relays or breaker trip circuits. In addition, RTU'S require separate lines for each channel of information transmitted to the RTU.

Recently, digital protective relays have been developed for the electric power field. These relays have microcomputers which can be programmed to perform various protection functions. For instance, digital distance relays and overcurrent relays are in use. These relays are capable of providing much more information than the analog relays. For instance, the location of the fault, and the current and voltage at the fault are available in the microcomputer controlled distance relay. Similarly, the current information is available from the digital overcurrent relay. This information has been transmitted to a remote computer, however, to date this has been accomplished by separate RS-232 channels for each relay.

There is a need therefore for a monitoring and control system for an electric power system which provides the capability of remote monitoring and control of protective relays.

There is a particular need for such a system for remotely monitoring and controlling analog protective relays.

There is also a need for such a system for remotely monitoring and controlling power systems incorporating both analog and digital protective relays.

There is, in addition, a need for such a system which provides data on the conditions which caused a protective relay to operate.

There is further need for such a system time tags events detected by the protective relays.

SUMMARY OF THE INVENTION

These and other needs are satisfied by the invention which is directed to a monitoring and control system for an electric power system that includes analog protective relays having inputs which include currents and voltages in the electric power system at the relays and having as outputs electrical contacts with states representing conditions within the protective relays based on the input voltages and currents. The monitoring and control system includes slave stations associated with the analog protective relays. The slave stations have digital computers programmed to store changes in state of the contacts in the associated protective relays and to generate and store a time tag for each change in state of the contacts. A communications network transmits the stored changes in state of the contacts and time tags therefor to a single master station having a digital computer programmed to receive and store the changes in state and the time tags.

In response to activity of the trip contact of an analog protective relay, the digital computer in the associated slave station stores the fault voltage and current for transmittal to the master station. Either the slave station digital computer or the master station digital computer computes fault parameters such as the distance to the fault and the type of fault from the fault currents and voltages. More particularly, the slave digital computers continually maintain samples of the voltage and current at the associated relays for a preset number of most recent power cycles. Upon detection of a fault, the samples retained at that time are stored as the pre-fault voltage and current and samples for a predetermined number of additional power cycles are stored as the post-fault current currents are also transmitted to the master station over the communications network. The microprocessor based protective relays on the network also store pre-fault and post-fault currents and voltages which are transmitted to the master station over the communications network along with other data available in such digital relays such as the location of the fault in a distance relay and the magnitude of an overcurrent in an overcurrent relay.

The master station repetitively polls the devices on the network, comprising the slave stations and the microprocessor based relays for contact activity only. For those devices indicating contact activity, the master station requests after polling has been completed the type of activity, time tag, and if it is a trip, the pre-fault and post-fault currents and voltages. Following a receipt of this information, the master station then performs routine data collection such as the present current and voltage. This data can be used for generating system parameters such as watts and VARs. These calculations can either be performed in the slave stations and microprocessor based relays and transmitted to the master station or the master station, can calculate these parameters from the data received from the slave stations and digital relays. The master station can also remotely command operation of a protective relay such as a trip.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
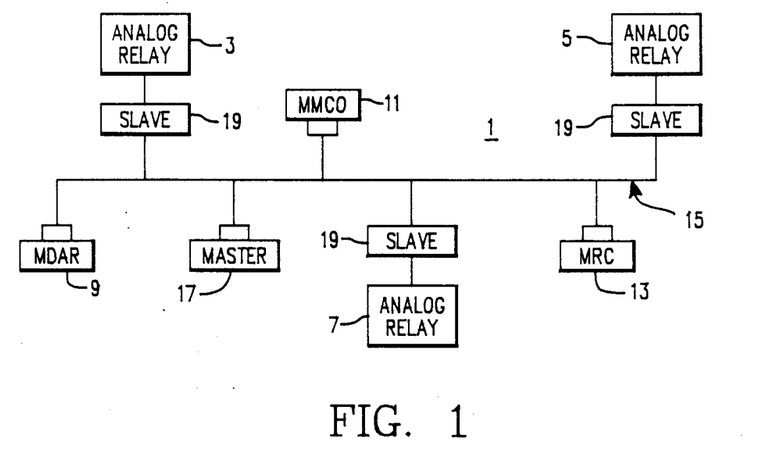
FIG. 1 is a schematic diagram in block form of a monitoring and control system, in accordance with the invention for analog and digital protective relays in an electric power system.

FIG. 1 illustrates a monitoring and control system 1 for a group of protective relays such as is found in a substation in an electric power system. The group of protective relays includes analog relays 3, 5 and 7 which may be of various known types. For instance, relay 3 could be an analog distance measuring relay, relay 5 an overcurrent relay, and relay 7 a phase comparison relay. Such relays are well known in the protective relay art. They are electromechanical devices which respond to the current, and in some cases the voltage or both the current and voltage, in the electric power system to operate contact outputs based upon criteria established by their structure.

The protective relays of FIG. 1 also include microprocessor based relays such as 9, 11 and 13. Relay 9 can be a microprocessor based distance measuring relay such as the Westinghouse Electric corporation MDAR relay. Relay 11 can be a microprocessor based overcurrent relay such as the Westinghouse MMCO relay, and relay 13 can be a microprocessor based reclosing relay such as the Westinghouse MRC relay. All of the relays 3-13 are connected to a local area network 15 which provides two-way communication between each relay and a master station 17. A suitable local area network is the INCOM system developed by Westinghouse Electric Corporation, various aspects of which are described in U.S. Pat. Nos. 4,644,547; 4,644,566; 4,646,319; 4,653,072; and 4,653,073. As will be more fully explained, slave stations 19 are required to connect the analog relays 3, 5 and 7 into the local area network 15. While only six protective relays have been shown in the system of FIG. 1 for simplification, it should be understood that many more protective relays could be included in the monitoring and control system 1. Typically, the majority of the protective relays in the system 1 would be analog relays since the microprocessor based relays have only been introduced recently.

Figure 2:
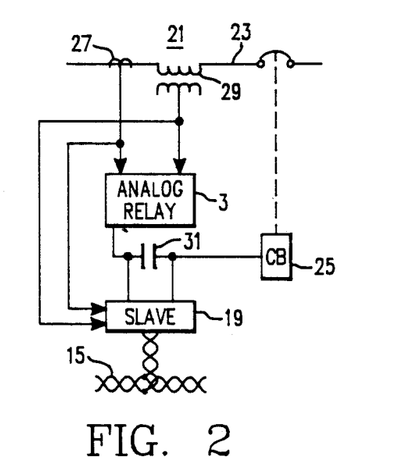
FIG. 2 is a schematic diagram of a portion of the system of FIG. 1 illustrating application of the invention to analog protective relays in the electric power system of FIG. 1.

A portion of an electric power system 21 to which the monitoring and control system 1 of the invention is applied is shown schematically in FIG. 2. It includes a line segment 23 protected by a circuit breaker 25 which is controlled by an analog protective relay such as the relay 3. Current transformer 27 and potential transformer 29 provide signals to the relay 3 representative of the current and voltage, respectively, in the line segment 23. While only a single phase line segment is depicted, it is to be understood that line segment 23 is three-phase and all three phases are monitored by the relay 3.

The protective relay 3, being by way of example an analog distance measuring relay, responds to faults which are within its protection zone by operating a trip contact 31. The trip contact 31 in turn actuates the circuit breaker 25 which opens to interrupt current through the line segment 23. While the analog distance measuring relay 23 responds to a fault within the protection zone of the relay, it provides no more definite indication of the location of the fault which initiated the trip. The typical analog relay also is not equipped to provide a remote indication of the trip.

In accordance with the invention, the analog relay 3 is connected to a slave station 19 which provides an interface to the local area network 15. The slave station monitors the trip contact 31 and records any change in contact state. As will be discussed, the slave station 19 also time stamps the change of state, and stores the current and voltage of the line segment, preferably for a predetermined number of cycles before and a preset number of cycles after the fault.

Figure 3:
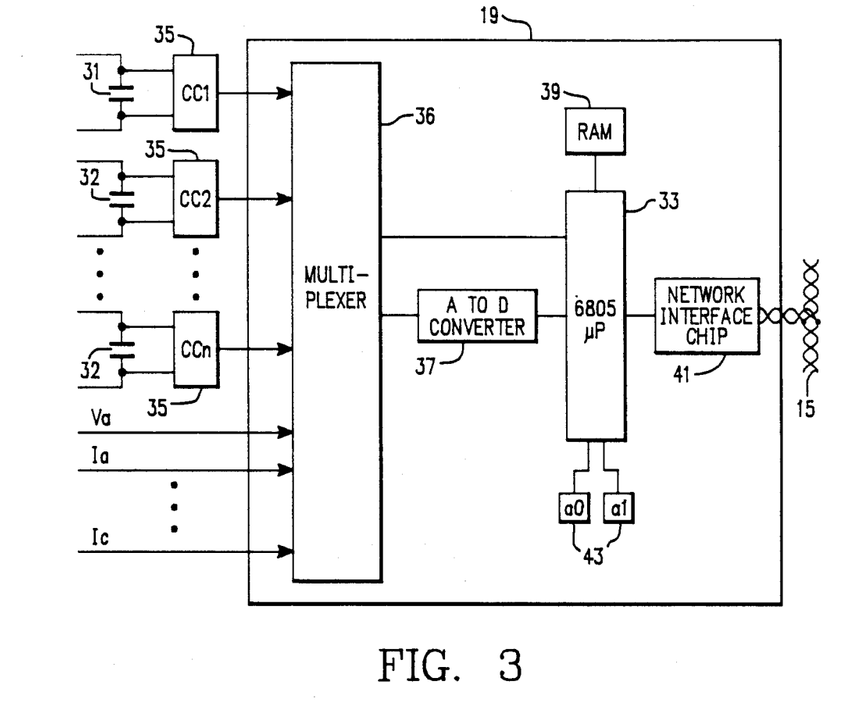
FIG. 3 is a schematic diagram in block form of a slave station which interfaces with the analog relays.

A slave station 19 is shown in more detail in FIG. 3. A microcomputer 33 serially monitors logic inputs generated by contact closure monitoring circuits 35 through a multiplexer 36. In the exemplary embodiment, the slave station monitors four such circuits 35. Typically, the analog relay will have a trip contact 31 (as shown in FIG. 2), and an alarm contact 32. The alarm contact provides an indication that an abnormal condition exists, but is not serious enough to require tripping the associated circuit breaker. In such a case, one; slave station could monitor the operation of two analog protective relays, each with two contact outputs. The microcomputer 33 also monitors the current and voltage at the associated relay or relays through the multiplexer 36 and analog to digital converter 37. The analog to digital converter 37 samples the voltage and current at typically 8 to 16 items per power cycle. The slave station continuously retains samples for the most recent of a predetermined number of power cycles of the current and voltage (two in the exemplary embodiment of the invention). Upon actuation of the trip contact, the slave station records in a random access memory (RAM) 39 the change in contact state, the time of the change in contact state, and the retained samples of voltage and current for the most recent predetermined number of power cycles. Samples of the voltage and current for a preset number of cycles after the trip contact changes state indicating a trip condition are stored with the pre-fault samples. In the exemplary embodiment of the invention, samples are stored for three power cycles following the trip.

The slave station also includes an interface chip 41 through which the slave station is connected to the local area network 15. The interface chip used in the Westinghouse INCOM network is described in allowed United States Ser. No. 07/625,747 filed on June 28, 1984. The slave station 19 also includes address switches 43 by which a unique network address for the slave station can be entered.

Figure 4:
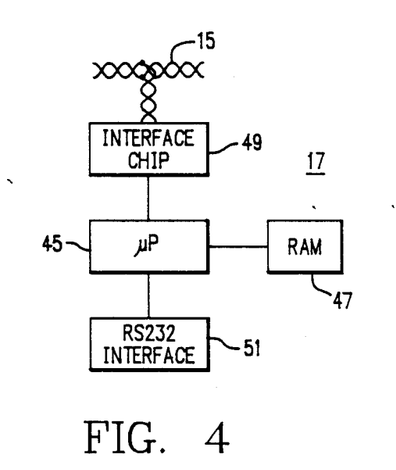
FIG. 4 is a schematic diagram in block form of the master station for the monitoring and control system of the invention.

The master station 17, which is shown schematically in FIG. 34 includes a microcomputer 45 and a random access memory (RAM) 47. It also includes an interface chip 49, similar to the chip 41, which connects the microcomputer 45 to the twisted wire cabing of the local area network 15. An interface 51 can also be provided for communication through an RS-232 link with a remote computer (not shown).

Figure 5:
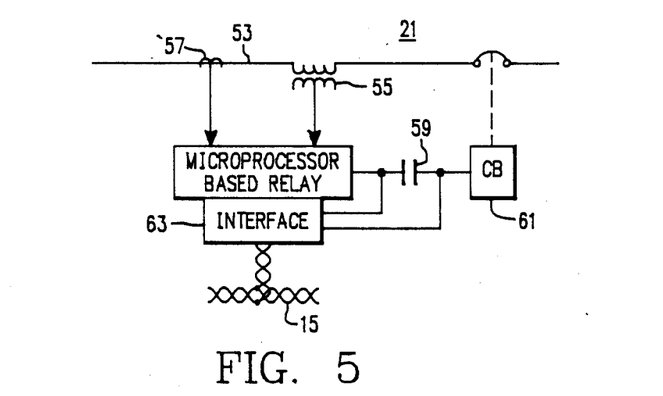
FIG. 5 is a schematic diagram of a portion of the electric power system illustrating the integration of a digital microprocessor based protective relay into the monitoring and control system of the invention.

The microcomputer based relays, such as relay 9, are shown connected in the electric power system 21 in FIG. 5. These "smart" relays also monitor the voltage and current in a three phase segment 53 (only one phase shown) of the electric power system through potential transformer 55 and current monitor 57, respectively. These relays each incorporate a microcomputer which digitally calculates the required parameters. For instance, in the case of the distance measuring relay, the microcomputer determines the complex impedance of the line segment 53 at the relay from the voltage and current and then compares it with a stored reach characteristic to determine if a trip contact 59 should be actuated. Actuation of the trip contact 59 operates an associated circuit breaker 61 to open circuit line segment 53. As in the case of analog relays, the microprocessor based relays may have additional contact outputs. Changes in state of these contacts are stored and communicated to the master station 17 through interface 63, similar to the chip 41, when requested. The digital relays are also capable of communicating through interface 63 additional information to the master station 17, such as the time of the trip, and the voltage and current for a predetermined number of cycles before and after a trip. Such "smart" relays have been used in electric power systems, but to date have not been integrated into a monitoring and control system with the analog relays.

Figure 6:
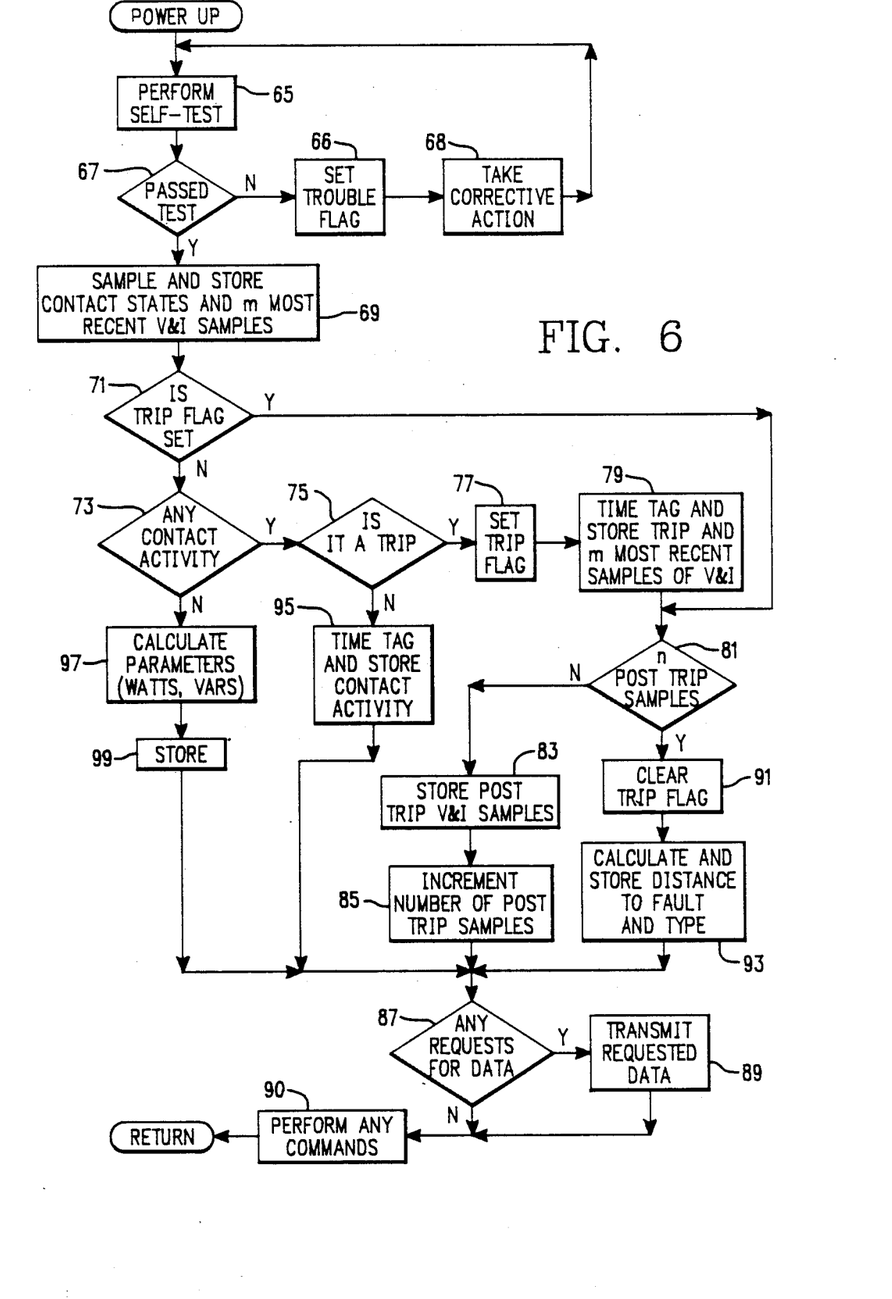
FIG. 6 is a flow chart of a suitable control program for the slave station of FIG. 3.

A flow chart for a suitable computer program for the microprocessor 33 of a slave station 19 is illustrated in FIG. 6. On power up, the microprocessor 33 performs a self test at 65. If the self test is not passed, as determined at 67, a trouble flag is set at 66 and corrective action is taken at 68. Depending upon the nature of the failure, the microprocessor itself may be able to take corrective action, or may be able to send a message to the master station that corrective action is required if the slave station can still communicate, or corrective action may require the services of a technician. If the self test is passed at 67, samples are taken and stored of the status of the contacts, and the magnitudes of the currents and voltages being monitored. The sampling rate is typically set at 8 or 16 samples per power cycle.

In the case of the voltages and currents, a moving window of samples for a selected number of most recent cycles of the monitored waveforms is maintained at 69. In the exemplary embodiment, samples representing the two most recent power cycles are continuously retained.

If post-fault data following a trip is not being recorded as determined at 71, a check is made at 73 to determine if there has been any change in the state of the monitored contacts. If there has been such contact activity and it is determined at 75 it is activity of the trip contact indicating a trip condition in the monitored relay as determined at 75, the trip flag is set at 77. The time tag of the activity of the trip contact, the identity of the contact which tripped and the retained samples of the current and voltage for the most recent two power cycles are stored at 79. Following a trip, the voltage and current for three cycles (in the exemplary system) of the post-trip voltage and current are stored. Hence, a check is made at 81 to determine if n post-trip sample representing the three post-trip cycles have been taken. Each of the n post-trip samples is stored at 83 and the number of post-trip samples is incremented at 85. If there are any requests from the master station for data as determined at 87, such data is transmitted at 89. If any commands, such as a remote trip directive, have been received from the master station, they are executed at 90 before the program is exited. The routine of FIG. 6 is repetitively called by a timed interrupt at intervals determined by the selected sampling rate. On subsequent runs, through the program after trip contact activity has been detected, the trip flag will be set at 71 and the samples of the voltage and current are stored at 83 as post-fault data. When the n post-trip samples have been stored as determined at 81, the trip flag is cleared at 91. In the embodiment of the invention wherein the slave station calculates the distance to a fault, this function is performed at 93 using the sampled current and voltage just prior to the trip in a manner which is well known in the art. This distance to the fault is stored for later transmission to the master station as requested at 87. While the distance to the fault will be calculated for the analog distance relays, it can also be calculated for the overcurrent relays and other types of relays which do not in themselves use the distance to the fault as a criteria for operation. This calculation of the distance to the fault can be performed in the slave station, or as will be seen, the voltages and currents can be transmitted to the master station which performs the fault location calculation. A determination can also be made from the currents and voltages of the type of fault, i.e., line to line, line to ground, etc., using known techniques. If the contact activity detected at 73 is not a trip as determined at 75, the activity is time tagged and stored at 95 for later transmission to the master station when requested at 87. If no contact activity is detected at 73, and there are no recent trips for which the post-trip voltages and currents are being stored, the slave station can perform other functions such as calculating various system parameters which can include calculation of the watts and VARs, as indicated at 97. These calculated parameters are stored at 99 for transmission to the master station when requested at 87.

Figure 7:
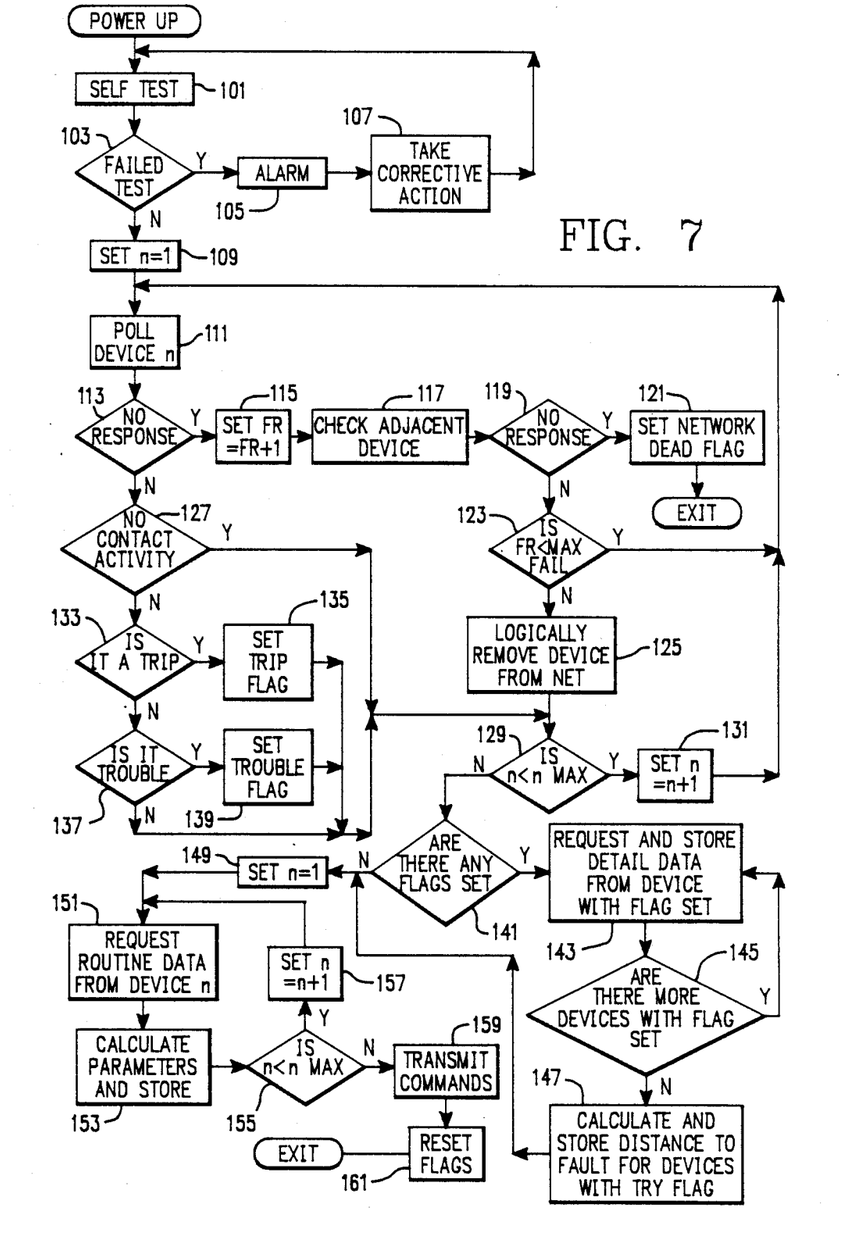
FIG. 7 is a flow chart of a suitable computer program for the microprocessor of the master station illustrated in FIG. 4.

FIG. 7 illustrates a flow chart for a suitable computer program for the microcomputer 45 of the master station 17 of the monitoring an control system 1 of the invention. Upon power up, the master station computer performs a self test at 101. If the self test has failed as determined at 103, and alarm is set at 105 and corrective action is taken at 107. As with the slave station, the corrective action is dependent upon the nature of the failure. If the master station still has the capability of communicating, the action taken could be to notify another computer of the failure, for instance through the RS-232 interface 51. The corrective action may be to by-pass the failed function. A critical failure could require servicing by a technician.

If the self test is passed, polling of each of the devices, including slave stations and digital relays, stations is initiated by setting a variable n representing the number of devices to 1 at 109. The nth device is then polled at 111. If there is no response from this device as determined at 113, a variable FR (failed response) is indexed at 115 and an adjacent device is checked for a response at 117. If there is no response at 119 from the adjacent device, the network is considered dead and a network dead flag is set at 121 before the routine is exited. However, if the adjacent device responds, the nth device is repetitively polled until either there is a response at 113 or a maximum number of failed responses is reached at 123. When the device fails to respond the preset number of times, such three in the exemplary system, the device is logically removed from the network at 125.

If a response is received from the nth device at 113, a check is made to determine if the device has had any contact activity at 127 and if not, and there are more devices to be polled, as determined at 129, n is indexed at 131 and the next device is polled at 111. If the device being polled reports contact activity, a check is made at 133 to determine if it was a trip, and if so a trip flag is set for that device at 135. If the contact activity is a trouble contact, as determined at 137, a trouble flag for that device is set at 139.

The master station thus sequentially polls each slave station and "smart" relay for any contact activity. Upon completion of the poll as determined at 129, the master station, returns to those polled devices determined at 141 to have a flag set and requests detailed data, such as the time tag and for trips, the pre-fault and post-fault currents and voltages. As indicated at 143, this is repeated for each device which had contact activity as determined at 145. If the master station is selected to compute the distance to the fault, this calculation is carried out at 147 using the current and voltage data gathered at 43. A determination of the type of fault can also be performed by the master station from the transmitted current and voltage data.

If no contact activity was reported during polling or after the detailed data regarding contact activity has been gathered, non-critical data is then collected from each of the devices. This routine data collection is initiated by setting n=1 at 149. The master station then requests routine data from the nth device at 151 and stores it. This routine data can include the present voltage and current, as well as the system parameters such as for example watts and VARs if calculated by the slave station or "smart" relay. The master station then calculates system parameters not calculated by the slave station or "smart" relays Until each device has transmitted its data as determined at 155, n is indexed at 157 and data is requested from the next device. When all the data have been gathered, any commands such as remote trip commands are transmitted to the appropriate device as indicated at 159. Before the routine is exited, all flags are reset at 161.

The monitoring and control system of the invention integrates the operation of the older type analog electromechanical protective relays with the newer digital microprocessor based relays. In addition, it provides data not currently available from the electromechanical relays. It also produces a centralized log of relay activity, and data and calculations for fault analysis and relay management.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In an electric power system including a plurality of analog protective relays having inputs including at least one of the current and voltage in said electric power system at the relays and having as outputs electrical contacts having states representing conditions within said protective relays based upon said inputs, a monitoring and control system comprising:
   a plurality of slave stations each associated with at least one of said analog protective relays and having a slave digital computer with means to store changes in state of said contacts in the at least one associated protective relay and means to generate and store a time tag for each change in state of said contacts, a communications network transmitting said stored changes in state of said contacts and the time tags therefore, and a single master station having a master digital computer programmed to receive the changes in state of said contacts and said tags for each slave station and to store the same.

2. The electric power system of claim 1 including circuit breakers each controlled by a trip contact of an associated protective relay, said associated protective relay changing the state of said trip contact to trip a circuit breaker in response to a fault condition detected by said protective relay from said inputs, said slave digital computer in the associated slave station including means to store the fault voltage and current at said associated protective relay when said trip contact changes state in response to a detected fault condition and to transmit the stored fault voltage and current over the communications network to the master station for storage with the change in state and time tag of the change in state of the trip contact.

3. The electric power system of claim 2 wherein the master digital computer in the master station including means to calculate from the stored fault voltage and current distance to the fault from the slave station which detected the fault and to store said distance to the fault.

4. The electric power system of claim 2 wherein said slave digital computer in the slave station associated with a tripped circuit breaker includes means to calculate the distance to the fault from the associated protective relay using the fault current and voltage, and means to transmit said distance to the fault to said master station over said communications network.

5. The electric power system of claim 2 including at least one microprocessor based protective relay having as an output electrical contacts having states representative of conditions in said microprocessor based relay and including a trip contact operated by a trip condition generated in said microprocessor based relay to trip an associated circuit breaker, said microprocessor based relay including a microprocessor which determines said conditions from the current and voltage in the electric power system at the relay, which stores the changes in state of said contacts and the conditions within the microprocessor based relay when the change in state occurred including the current and voltage of the electric system at the microprocessor based relay and the time tag of the time of the change in state and said conditions at the changes in state over said communications network to said master station in response to a transmit command from said master station.

6. The electric power system of claim 5 wherein said master computer in the master station includes means to periodically poll the slave stations and the microprocessor based relay in sequence only to determine which if any of said slave stations and microprocessor based relays have stored changes in state of contacts, and when polling is completed to generate a transmit command commanding transmission of the stored changes in state, time tags and currents and voltages from those slave stations and microprocessor based relay having store changes in state of contacts.

7. The electric power system of claim 6 wherein said master computer in said master station includes send means to send commands to a designated slave station or the microprocessor based relay including a command to trip an associated circuit breaker, and wherein said designated slave station or the microprocessor based relay includes means to execute said command including tripping an associated circuit breaker.

8. The electric power system of claim 2 wherein the salve digital computers of the slave stations include means to continually sample the current and voltage in the electric power system to retain a selected number of most recent samples of the current voltage, at the associated protective relays, and means to store as said stored voltage and current retained samples of the voltage and current for a predetermined number of cycles of said current and voltage before a change in state of the trip contact and for a preset number of cycles after the change in state.

9. The electric power system of claim 8 wherein said master computer in the master station includes means to periodically poll the slave stations in sequence to determine which slave stations have stored changes in state of contacts and means operative when all slave stations have been polled, to command transmission of the stored changes in state, time tags, and voltages and currents from those slave stations having stored changes in states of contacts.

10. The electric power system of claim 9 wherein said master digital computer in said master station include means to periodically commands from each slave station the present current and voltage at selected protective relays, and means to calculate therefrom selected system parameters.

11. The electric power system of claim 9 wherein said slave digital computers in said slave stations periodically include means to calculate from the present current and voltage selected system parameters, and means to upon command from the master station transmit said selected system parameters to the master digital computer over said communications network.

12. The electric power system of claim 2 wherein said master computer in said master station includes means to send commands over said communications network to a slave station associated with a designated analog protective relay including a trip command to trip a circuit breaker associated with the designated analog protective relay and wherein said slave station associated with the designated analog protective relay includes means to execute said command including tripping an associate circuit breaker.

13. In an electric power system including multiple protective relays a plurality of which comprise independent analog protective relays each having inputs including at least one of the current and voltage in said electric power system at the relay and having as outputs electrical contacts having states representing conditions within said analog protective relay including trip conditions based upon said inputs, a monitoring and control system comprising a plurality of slave stations each associated with at least one analog protective relay, each said slave station having a digital computer programmed to store for each associated analog relay changes in state of said electrical contacts including a change in state of a contact indicating a trip condition in said analog protective relay and to store the current and voltage at said analog protective relay at said change in state of said contact indicating a trip condition, a common communications network transmitting for each slave station said stored changes in state of said contacts indicating a trip condition and the stored current and voltage at the change in state for said associated analog protective relays, and a master station having a master digital computer programmed to receive from each slave station said stored change in state of said contacts indicating a trip condition and the stored current and voltage at the change in state transmitted by the communications network, one of sad slave digital computers and said master digital computer being programmed to determine the distance to a fault causing the change in contact state from the current and voltage at the change in contact state, and when said slave digital computers determine said distance to a fault transmitting the distance to the fault over the common communications network to the master station.

14. The electric power system of claim 13 wherein said slave digital computers are programmed to sample the current and voltage in the electric power system at at least one of the associated analog protective relays, and to periodically calculate for said at least one associated analog protective relay from the present current and voltage values for selected system parameters and store the calculated values of said selected system parameters, wherein said master station is programmed to periodically generate a command for transmission of said stored calculated values of the selected system parameters, and wherein the slave station digital computers are further programmed to transmit the stored calculated values of the selected systems parameters to the master station over said common communications network.

15. The electric power system of claim 13 wherein said slave digital computer in each slave station is programmed to continually sample the current and voltage in the electric power system at the at least one associated analog protective relay, wherein said master digital computer is programmed to periodically request the present values of said current and voltage at the at lest one analog protective relay associated with each slave station, wherein said slave digital computer in each slave station is further programmed to transmit in response to such request latest values of said current and voltage at the at least one associated analog protective relay over said common communications network, and wherein said master digital computer is further programmed to calculate and store latest values of selected system parameters from the transmitted latest values of current an voltage.

* * * * *

UNITED STATES PATENT AND TRADEMARK OFFICE
CERTIFICATE OF CORRECTION

PATENT NO. : 4,972,290
DATED : November 20, 1990
INVENTOR(S) : SHAN C. SUN ET AL.

It is certified that error appears in the above-identified patent and that said Letters Patent is hereby corrected as shown below:

In the Abstract, line 2, "mcroprocessor" should be --icroprocessor--.

Column 2, line 56, after "current" insert --and voltage data. The pre-fault and past-fault voltages and--.

Column 4, line 57, the ";" should be deleted.

Claim 5, column 9, line 12, after "state" insert --of the contact, and which transmits said stored changes in state--.

Claim 8, column 9, line 37, "salve" should be --slave--.

Claim 13, column 10, line 37, "sad" should be --said--.

Claim 15, column 10, line 67, "lest" should be --least--.

Signed and Sealed this

Twenty-second Day of December, 1992

Attest:

DOUGLAS B. COMER

Attesting Officer    Acting Commissioner of Patents and Trademarks